US012050652B2

(12) United States Patent
Wang et al.

(10) Patent No.: US 12,050,652 B2
(45) Date of Patent: Jul. 30, 2024

(54) SERVICE PACKAGING METHOD BASED ON WEB PAGE SEGMENTATION AND SEARCH ALGORITHM

(71) Applicant: ZHEJIANG UNIVERSITY, Hangzhou (CN)

(72) Inventors: Naibo Wang, Hangzhou (CN); Xiya Lv, Hangzhou (CN); Zitong Yang, Hangzhou (CN); Tao Wang, Hangzhou (CN); Jianwei Yin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 277 days.

(21) Appl. No.: 17/614,978

(22) PCT Filed: Nov. 15, 2019

(86) PCT No.: PCT/CN2019/118991
§ 371 (c)(1),
(2) Date: Nov. 29, 2021

(87) PCT Pub. No.: WO2020/238070
PCT Pub. Date: Dec. 3, 2020

(65) Prior Publication Data
US 2022/0245203 A1    Aug. 4, 2022

(30) Foreign Application Priority Data

May 27, 2019   (CN) .......................... 201910447448.0

(51) Int. Cl.
*G06F 16/951*   (2019.01)
*G06F 16/9538*  (2019.01)
*G06F 16/955*   (2019.01)
*G06F 16/957*   (2019.01)

(52) U.S. Cl.
CPC ........ *G06F 16/951* (2019.01); *G06F 16/9538* (2019.01); *G06F 16/955* (2019.01); *G06F 16/9577* (2019.01)

(58) Field of Classification Search
CPC .. G06F 16/951; G06F 16/955; G06F 16/9577; G06F 16/9538
(Continued)

(56) References Cited

U.S. PATENT DOCUMENTS 9,881,323 B1 *  1/2018  Agronow ........... G06Q 30/0277
10,521,496 B1 * 12/2019  Goodwin .............. G06F 40/205
(Continued)

FOREIGN PATENT DOCUMENTS

CN    101004760 A    7/2007
CN    101515287 A    8/2009
(Continued)

*Primary Examiner* — Sherief Badawi
*Assistant Examiner* — Jessica N Le
(74) *Attorney, Agent, or Firm* — Jiwen Chen; Joywin IP Law PLLC

(57) ABSTRACT

The present invention provides a service packaging method based on web page segmentation and search algorithm, comprising the following steps: a service extraction stage, comprising dynamic packaging and/or static packaging; for dynamic packaging, parsing a dynamic web page, tagging forms that possibly exist in parsed dynamic form information, and tagging and defining, by a user, desired forms among the forms that possibly exist; for static packaging, parsing a static web page, blocking and tagging parsed static forms, and selecting and defining, by the user, desired blocks, and filling in a name, description information and an extraction rule of a service; and a service calling stage, comprising inputting, by the user, related information for calling a service, and generating, by a back end system, a corresponding service according to the received related information for calling the service and according to the (Continued)

extraction rule, and returning the corresponding service to a front end. The present invention greatly increases the efficiency of acquiring data by a user.

5 Claims, 2 Drawing Sheets

(58) Field of Classification Search
USPC .......................................................... 707/709
See application file for complete search history.

(56) References Cited

U.S. PATENT DOCUMENTS

| | | | | |
|---|---|---|---|---|
| 10,534,851 | B1* | 1/2020 | Chan | G06Q 30/0255 |
| 11,205,041 | B2* | 12/2021 | Kumar | G06F 40/194 |
| 2007/0055656 | A1* | 3/2007 | Tunstall-Pedoe | G06N 5/00 |
| 2009/0171999 | A1* | 7/2009 | McColl | G06F 16/2465 |
| 2011/0296291 | A1* | 12/2011 | Melkinov | G06F 40/131 |
| | | | | 715/229 |
| 2011/0321160 | A1* | 12/2011 | Mohandas | H04L 63/1416 |
| | | | | 726/22 |
| 2015/0193402 | A1* | 7/2015 | Ayoub | G06F 40/143 |
| | | | | 715/234 |
| 2019/0034441 | A1* | 1/2019 | Capon | G06F 40/143 |
| 2020/0110781 | A1* | 4/2020 | Staszak | G06F 16/9538 |
| 2021/0049234 | A1* | 2/2021 | Kumar | G06F 40/117 |

FOREIGN PATENT DOCUMENTS

| | | |
|---|---|---|
| CN | 103034690 A | 4/2013 |
| CN | 105516337 A | 4/2016 |
| WO | WO2013016139 A | 1/2013 |

* cited by examiner

SERVICE PACKAGING METHOD BASED ON WEB PAGE SEGMENTATION AND SEARCH ALGORITHM

This is a U.S. national stage application of PCT Application No. PCT/CN2019/118991 under 35 U.S.C. 371, filed Nov. 15, 2019 in Chinese, claiming priority to Chinese Patent Applications No. 201910447448.0, filed May 27, 2019, all of which are hereby incorporated by reference.

FIELD OF TECHNOLOGY

This present invention relates to the technical field of service computing, and in particular, to a service packaging method based on web page segmentation and search algorithm.

BACKGROUND

With the development of Internet, service providers tend to display their service data through web pages. However, various web pages which provide convenience restrict the use of these source data by developers. A service packaging system is intended to package the data in web pages into a service, and provide RestFul API for calling the service to use the service in the development process for developers.

Web page block segmentation technology is the analysis and processing of existing Web page documents, specifically is the technology that the whole Web page is segmented into multiple blocks containing information data, so as to achieve advertisement removal, main information extraction and other functions, which mainly include page block segmentation technology based on node entropy, page block segmentation technology based on visual features, Web page block segmentation technology based on content distance etc. The Web page block segmentation technology has been widely used in various fields of the Internet industry.

A service is a collection of API with multiple attributes that belong to a specific service class which is provided by a developer or a class of developers.

API is certain predefined function designed to provide applications and developers with the ability to access a set of routines based on a certain software or hardware without having to access the source code or understand the details of the inner workings. API has multiple input and output attributes, belonging to a specific developer, and being subordinate to a specific service.

Web crawler (also known as web spider, web robot, and more commonly as web chaser in the FOAF community) is a program or a script that automatically crawl the World Wide Web information according to certain rules. Other less commonly used names include ant, auto-index, simulator or worm.

SUMMARY OF THE INVENTION

The object of the present invention is to provide a service packaging method based on web page segmentation and search algorithm. The present invention greatly increases the efficiency of acquiring data by a user.

To realize the object of the present invention, the present invention provides the following technical solution:

a service packaging method based on web page segmentation and search algorithm, comprising following steps:

a service extraction stage, comprising dynamic packaging and/or static packaging; for dynamic packaging, parsing a dynamic web page, tagging forms that possibly exist in parsed dynamic form information, and tagging and defining, by a user, desired forms among the forms that possibly exist; for static packaging, parsing a static web page, blocking and tagging parsed static forms, and selecting and defining, by the user, desired blocks, and filling in a name, description information and an extraction rule of a service;

and a service calling stage, inputting, by the user, related information for calling a service, and generating, by a back end system, a respective service according to the received related information for calling the service and according to an extraction rule, and returning the service to a front end.

The present invention provides a service packaging method based on web page segmentation and search algorithm, which can automatically analyze the page, and can package the web page into a service through a module by which the packaging of a web page can be completed with only several clicks and a small amount of input, generate crawler rules, and return the corresponding structured data according to the user's requirements, which greatly improves the efficiency of data acquisition by a user.

BRIEF DESCRIPTION OF THE DRAWINGS

In order to explain the technical solutions of the embodiments of the present invention more clearly, the following will briefly introduce the drawings that need to be used in the embodiments of the present invention. Obviously, the drawings described below are only some embodiments of the present invention. For those of ordinary skill in the art, without creative work, other drawings can be obtained based on the drawings.

DESCRIPTION OF THE EMBODIMENTS

For better understanding of the purpose, technical solutions and advantages and of the present invention, the following is a further detailed description of the present invention in combination with the attached drawings and embodiments. It should be understood that the embodiments described herein are intended only to explain the present invention and do not limit the claimed scope of the present invention.

The present invention provides a service packaging method based on web page segmentation and search algorithm, comprising a service extraction stage and a service calling stage. The service extraction is a module by which the packaging of a web page can be completed by a packager with several clicks and a small amount of input, which can package a web page into a service. The service calling refers to a calling to a packaged service and provides several parameters to satisfy input and screening requirements. These parameters include uniform parameters, and include specific parameters generated by different web pages, Taking the page http://www.ceic.ac.cn/history as an example, the running rule of the service packaging method based on web page segmentation and search algorithm is explained.

Figure 1:
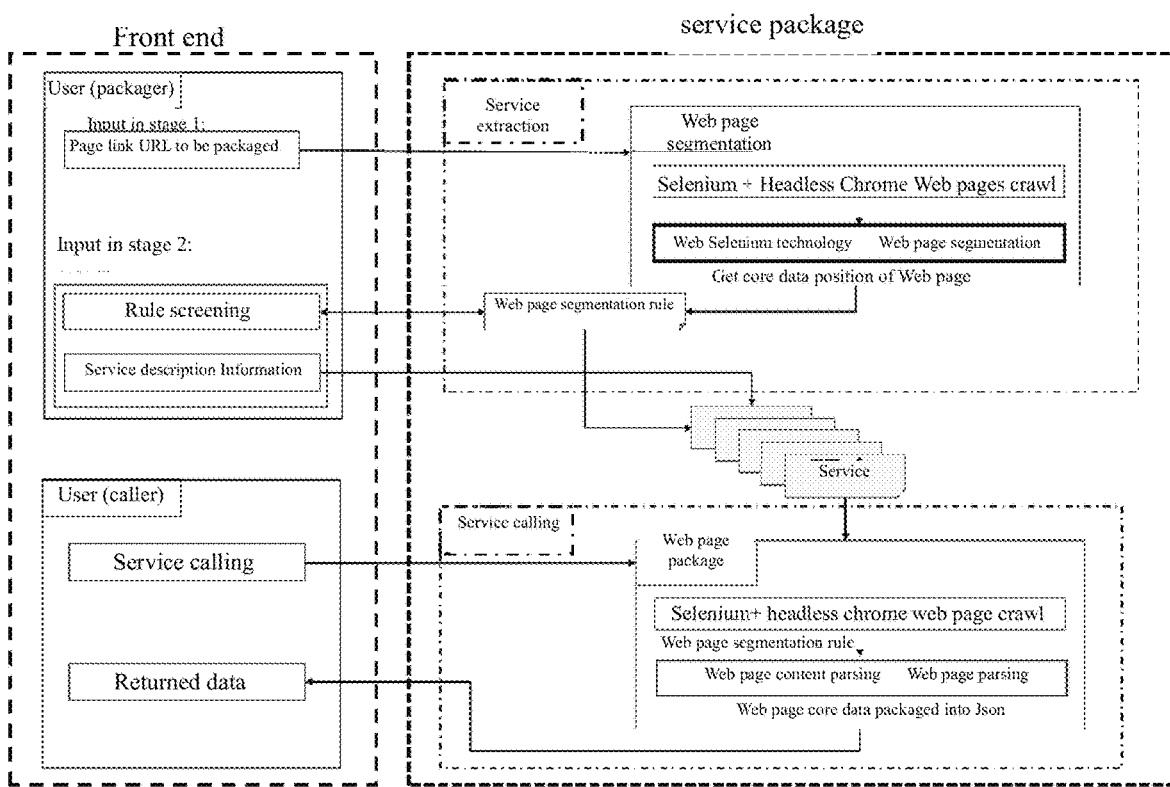
FIG. 1 is an implementation framework of a service packaging method based on web page segmentation and search algorithm and system provided by the present invention.
Figure 2:
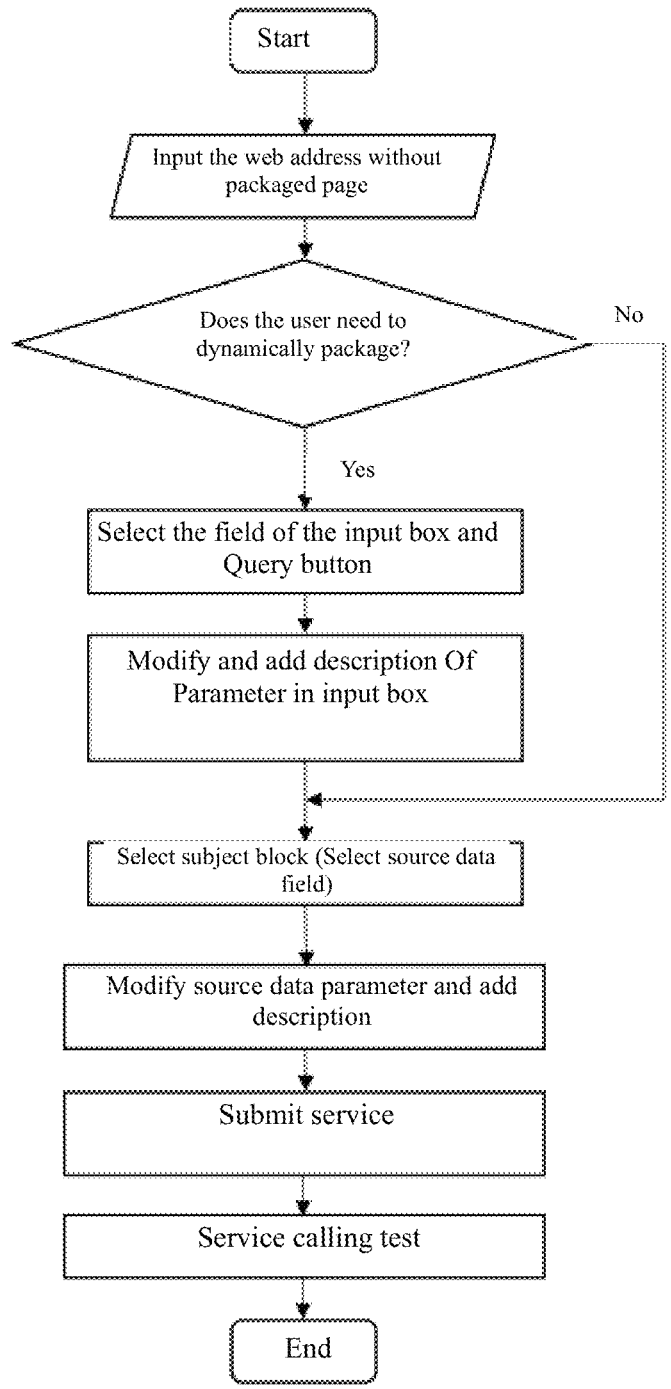
FIG. 2 is a user flow chart of a service packaging method based on web page segmentation and search algorithm and system provided by the present invention.

As shown in FIG. 1 and FIG. 2, the present invention provides a service packaging method based on web page segmentation and search algorithm, comprising following processes:

Stage 1: Service Extraction

Service extraction mainly contains two functions: static packaging and dynamic packaging, that is, static packaging of web pages in which data is directly presented; dynamic packaging of web pages that require input of certain query content and require the clicking of a button to present data.

For a user, service extraction only requires the user to click a few times and fill in service description information. Service extraction implicitly performs two different extraction rules based on the web page. For static web pages in which the data directly presented in the web page, static web page extracting will be performed; for dynamic web pages in which the user needs to performing inputting and clicking to present data, dynamic web page extracting will be performed.

The dynamic packaging comprises the following steps:

S1-1: parsing a dynamic web page, specifically comprising:

S1-1-1: filling in, by a user himself or herself, a URL address, the address being any web link accessible by Internet;

S1-1-2: using crawler technology to crawl a source code of a web page corresponding to the URL address, wherein a crawler tool of the crawler technology is Selenium+BeautifulSoup+Pyquery in Python3.6.

S1-1-3: judging whether there is a <form> tag on a search page, converting the source code of the web page into a structured class data, and searching the form tag in the class data, and tagging it, wherein the tag information is a file in a json format, and an example thereof is shown below:

And wherein the Parsing of the json file is as follows:

*url is a web address.

*form_check is 1/0, if the form check is 0, than the form is not used for checking, otherwise if the form check is 1, then the form is used for checking.

*main_form_index is the index number of the forms array selected by default below, used in conjunction with form_check.

*forms is an array where all forms in the page are stored (normally there is only one form in the page, but all forms are retrieved here, with the first being the default). Finally, the front end modifies the value of "main_form_index" according to the user's actual selection.

Each element in the *forms is parsed as follows, such as forms[0]:

*id and len are auxiliary information.

*All the css_selector are selectors for the form.

*main_btn_index is the index number of the main button in submit_button_list, which can be changed according to the user's selection.

*input_list is the parameter list of the form and also the input parameter list of the background api, such as input_list[0]:

*query_name is the query name which can be modified by the user and is a name used by our API.

*required is an indication that must be entered by the user.

*value is a default item of a value input by the user and can be modified by the user.

S1-1-4: constantly printing out parsed log information in a GUI display background.

Wherein the log information is in the format of Logging+ timestamp→+what is being processed. If the last line is

```
{
  "url": "http://www.ceic.ac.cn/history",
  "form_check": 0,
  "main_form_index": 0,
  "forms": [
    {
      "id": 0,
      "main_btn_index": 0,
      "len": 11,
      "css_selector": "html > body:nth-child(2) > div > div:nth-child(3) > div > div > div:nth-child(2) > form",
      "input_list": [
        {
          "id": 0,
          "type": "text",
          "name": "start",
          "required": false,
          "css_selector" : "html > body:nth-child(2) > div > div:nth-child(3) > div > div > div:nth-child(2) > form > div > input:nth-child(2)",
          "value": "",
          "query_name": "start",
          "description": "",
          "index": "T1"
        },
      ],
      "submit_button_list": [
        {
          "id": 0,
          "type": "a",
          "css_selector": "html > body:nth-child(2) > div > div:nth-child(3) > div > div > div:nth-child(2) > form > div:nth-child(5) > a:nth-child(4)",
          "index": "b1"
        }
      ]
    }
  ]
}
``` successful, it is 200+ json file address of webpage table rule+webpage screenshot address; If the last line is unsuccessful, it is 503+Procedure failed, please retry!, such as:

Logging 2018-11-26 20:23:14.572181→Crawl HTML Document from http://www.ceic.ac.cn/history, please wait for about 40 s(max 60 s)

Logging 2018-11-26 20:23:18.772222→Finding form table on http://www.ceic.ac.cn/history Logging 2018-11-26 20:23:18.974834→Finished on http://www.ceic.ac.cn/history 200http://183.129.170.180:18088/statics/form_test1/form_list.json http://183.129.170.180:18088/static/form_test1/form_seg_shot.png S1-1-5: using image processing technique (PIL library in Python) to tag all form information that possibly exist in the page, and position of each input box and a possible submit button in each form.

Wherein the position of the tagged element need to be obtained during the process of tagging, and JavaScript's getBoundingClientRect function is used here to obtain the width and height of the element and the position thereof with respect to the image.

S1-2: selecting, by the user, a form and defining input parameter information, specifically comprising:

S1-2-1: independently selecting, by the user, whether the user himself or herself needs to use the form, if he or she does, selecting the form number, and if he or she doesn't, skipping this step;

S1-2-2: independently defining, by the user, a name and an example value of each input box, and selecting a number of the submit button;

S1-2-3: submitting the information modified by the user to the background, and generating, by the background, a form extraction rule based on the information.

The static packaging comprises the following steps:

S1-3: parsing a static web page, specifically comprising:

S1-3-1: using crawler technology to crawl a source code of a web page corresponding to the URL address.

S1-3-2: using a breadth-first search algorithm to search all items that possibly exist in the page.

Wherein, the breadth-first search algorithm is as follows: generating a DOM tree structure of the page, creating a traversal sequence list, putting HTML nodes in the list, traversing the list sequentially, putting child nodes of each node at end of the list until all the nodes are traversed.

S1-3-3: using page segmentation algorithm to merge all items with the same structure into a block.

Wherein, the web page segmentation algorithm is: calculating the label paths of all nodes and comparing the label paths with the label paths of brother nodes thereof. If the two label paths are the same, the two nodes are in the same block. The algorithm merges all nodes with the same label path into the same block.

S1-3-4: using a weighted sorting algorithm to screen out at most 10 largest blocks.

Wherein, the weighted sorting algorithm is as follows: sorting first 15 blocks according to numbers of list items in each block from large to small; sorting first 15 blocks according to a block size of each block from large to small; selecting intersection of the two lists and selecting first 10 blocks as a largest block finally selected.

S1-3-5: using image processing technology to tag the screened blocks.

S1-3-6: constantly printing out parsed log information in a GUI display background. Wherein the log information is in the format of Logging+timestamp→+what is being processed. If the last line is successful, it is 200+ json file address of webpage table rule+webpage screenshot address; If the last line is unsuccessful, it is 503+Procedure failed, please retry!, such as:

2018-11-26 13:31:21.723678→Crawl HTML Document from http://www.ceic.ac.cn/history, please wait for about 40 s(max 60 s)

2018-11-26 13:31:25.826979→Handling the input forms on http://www.ceic.ac.cn/history 2018-11-26 13:31:31.362985→Run Pruning on http://www.ceic.ac.cn/history 2018-11-26 13:31:31.365060→Run Partial Tree Matching on http://www.ceic.ac.cn/history 2018-11-26 13:31:31.380825→Run Backtracking on http://www.ceic.ac.cn/history 2018-11-26 13:31:31.381136→Merging and generating rules and blocks on http://www.ceic.ac.cn/history,process:1%

2018-11-26 13:31:31.381136→Merging and generating rules and blocks on http://www.ceic.ac.cn/history,process:50%

2018-11-26 13:31:43.596304→Merging and generating rules and blocks on http://www.ceic.ac.cn/history, process:99%

2018-11-26 13:31:43.672126→Selecting the main segment on http://www.ceic.ac.cn/history 2018-11-26 13:31:44.780230→Generating sections on http://www.ceic.ac.cn/history 2018-11-26 13:31:45.128704→Generating api_info on http://www.ceic.ac.cn/history 2018-11-26 13:31:45.183179→Generating rules on http://www.ceic.ac.cn/history 2018-11-26 13:31:45.183506→Output Result JSON File on http://www.ceic.ac.cn/history 2018-11-26 13:31:45.194587→Finished on http://www.ceic.ac.cn/history 200 http://183.129.170.180:18088/statics/15432390785389/api_info.json S1-4: selecting, by the user, blocks and defining input parameter information.

S1-4-1: independently selecting, by the user, a number of the block desired by the user himself or herself.

S1-4-2: defining, by the user, a name and description of data number in the blocks automatically analyzed by a system, and judging whether the blocks are desired.

S1-4-3: filling in, by the user, a name and description information of a to-be-generated service.

S1-4-4: submitting, by the system, the service information modified by the user and the extraction rule of each item to a service generation background in a json format.

Wherein the extraction rule algorithm is as follows: starting from THE HTML tag according to the DOM tree structure, using > to represent the progressive relationship and using NTH-child (I) to represent the i th node of the layer, thereby generating the extraction rule in the form of css_selector.

The following is an example of a service information file:

```
{
  "api_name": "China Earthquake Network -- historical query",
  "form_rules_link": "http://183.129.170.180:18088/statics/form_list.json",
  "api_description": "China Earthquake Network -- historical query",
  "api_url": "http://www.ceic.ac.cn/history",
  "img_link": "http://183.129.170.180:18088/static/test/seg_shot.png",
  "api_crawl_rules_link": "http://183.129.170.180:18088/statics/test/rules_list.json",
  "json_link": "http://183.129.170.180:18088/statics/test/example.json",
  "main_sec_id": 0,
  "sections": [
     "Magnitude (M) seismogenic time (UTC+8) Latitude (°) Longitude (°) depth (km) Reference position",
  ],
  "candidate": [
    [
      {
        "id": 0,
        "name": "text_0",
        "description": "text_description",
        "type": "text",
        "example": "Latitude: ",
        "select": 1,
        "parent_id": -1
      },
      {
        "id": 1,
        "name": "text_1",
        "description": "text_description",
        "type": "text",
        "example": "greater than",
        "select": 1,
        "parent_id": -1
      },
    ],
  ]
}
```

The format of the file is described as follows:

*api_name is an api name defined by the user.
*api_description is an api description defined by the user.
*img_link field is the link address of the main part of the image captured.
*api_crawl_rules_link field is the json file address of the crawler rule.
*json_link field is the largest file address by default.
*main_sec_id is the default index value of the subject block. It is usually 0, but the value thereof can be changed according to the user's actual requirements.
*sections is an array of strings, wherein each item is the literal content of each block. sections [main_sec_id] is directly indexed to obtain the literal content of the block.
*api_info ["candidate"] is a two-dimensional array with each item containing element information in each topic block. Element information is parsed as follows:

```
{
  "id": 0, //Element ID information
  "name": "text_0", //Element name
  "description": "text_description", //Element description
  "type": "text", //Element type
  "example": "latitude: ",//Element example value
  "select": 1,//Whether to output this element
  "parent_id": -1//ID of the parent element of the element
},
```

Wherein there are three types of "type": text, img and link respectively representing text, picture and hyperlink types. parent_id is used for background identification when the element is queried in the service calling stage.

An example and description of a crawler rule JSON file are as follows:

```
[{
  "record_id": 0,
  "texts": [{//Rule description for all text information
     "id": 0,//Corresponding to name in the api parameter list, unique
     "css_selector": ""//Position of the text tag, which can be converted according to the rank below
     "rank":0//Number of position of the text in the node
  }],
  "images": [{//Rule description for all image information
     "id": "img_1",
     "type": "img/back_img", //img or backgroud_img is defined according to the image form
```

```
    "css_selector": ""//Select src, alt, title according to this value (the latter two
attributes may not exist)
   }],
   "links": [{//Rule description for all link information
      "id": 0,
      "css_selector": "",//Obtain href
      "texts": [{//Text information description in link information
         "id": 0,
         "css_selector": "",//Obtain href
         "rank": 0
   }],
   "images": [{//Image information description in link information
         "id": 0,
         "type": "img/back_img",
         "css_selector": ""
      }]
   }]
},
{
   "record_id": 1,//Every record has a unique css_selector
}
]
```

Wherein the text message needs to be located based on both css_selector and rank information. img comprises image information in the img tag and background image information in the css, which needs to be extracted according to different types of extraction rule. The extraction rule is as follows: if the image is an image with the img tag, then the link address of the img tag will be extracted. If the image is the link information of the background image, then it is necessary to search the background-img attribute in the css attribute of the element where the image is located, and then extract the corresponding link.

The background file can parse the page according to this parsing rule.

S1-5: generating the service.

S1-5-1: parsing, by the service generation background, the service information and the extraction rule information, and checking fault tolerance.

S1-5-2: generating, by the service generation background, a service desired by the user and an address and a query parameter corresponding to calling the service, for waiting for calling.

Wherein, the service generation background needs to store the service information and the extraction rule defined by the user in its own database and query the service information again when the service is called.

In this example, the generated service API address is: URL://call_service/79, which indicates that the generated service ID is 79. This interface complies with restAPI specification, so the user can use this interface to query, call, delete, and modify the service information.

Stage 2: Service Calling

The service calling refers to a calling to a packaged service and provides several parameters to satisfy input and screening requirements. These parameters include uniform parameters, and include specific parameters generated by different web pages, The user can call the corresponding service by checking service information and writing RestFul API.

The specific steps are as follows:

S2-1: filling in, by the user, a query parameter specified by the service, and calling API.

Wherein the query parameter is each of the form input options so as to perform the input query; meanwhile, it also includes each of the returned results so that the user can perform screening on the returned results according to the class parameter. Meanwhile, the maximum number of pages parameter is _max_page to solve the pagination problem in the web page, the default is 5 pages of data.

For example, the url called by the user is:

```
url://call_service/79?__max_page = 7 & weidu1 = 30 & jingdu2 = 20 & magnitude (M) =
3.5 & link_5.reference position = Gengma County, Lincang City in Yunnan Province
```

Wherein, _max_page is the maximum number of pages in the system. Weidu1 and Jingdu2 are the input query parameters of the form; Magnitude (M) and link_5. reference position is the returned result parameter of the service, "link5.reference position" refers to the reference position parameter under link5.

The meaning of the above link is: capturing the paging content, up to 7 pages, wherein the input parameter weidu1 value is 30, and jingdu2 value is 20; when outputting, selecting the data with a result of magnitude (M)=3.5, link_5. reference position=Gengma County, Lincang City in Yunnan Province to display.

If Chinese characters exist, then UTF-8 code needs to be used.

S2-2: opening, by a calling background, a real URL address corresponding to the API by using crawler technology according to an address of the API called by the user.

S2-3: deciding, by the calling background, whether to fill in and query the form information according to the user's selection upon packaging the service.

Wherein if the user needs to fill in the form information, the user can fill in the form content according to the query parameter value input by the user. The supported input box type is the element form tag supported by HTML5, such as: text,number,email,password,textarea,radio,checkbox,select,datalist,button,submit,rest.

S2-4: using, the calling background, crawler technology to crawl a source code of the page after the form is processed.

S2-5: extracting, by the system, related items in the page according to the stored extraction rule information, and performing structural conversion and generating a returned result according to a name and parameters of the returned result defined by the user.

S2-6: performing screening, by the calling background, on the returned result according to the query parameter of the user.

S2-7: returning, by the system, a calling result to the front end.

Wherein an example of the returned result is as follows:

[{" link_5 ": {" href" : "http://news.ceic.ac.cn/CD20181127064153.html", "reference position" : "Gengma county, Lincang city in Yunnan Province"}, "record_id" : 0, "seismogenic time (UTC + 8)" : "2018-11-27 06:41:53 depth (km) ":" ", "8", "latitude (°)" : "23.49", "longitude (°)" : "99.46", "magnitude (M)" : "3.5"}]

The service packaging method based on web page segmentation and search algorithm has been described above, the packing method tries to: analyze any type of web pages, and automatically parse out the main possible information that may exist in the page; then parse out each format of each block after blocking the information, wherein after a simple modification by the user, this page can be converted into a calling service that can be called directly; and then returns formatted and structured data that the user needs. Meanwhile, the present invention provides dynamic form query function. If a dynamic form exists in the page, the form query box can be converted into query parameter for the use of the user. Compared with the traditional crawler, the present invention can automatically analyze the page, generate crawler rules, and return the corresponding structured data according to the user's requirements. Therefore, the present invention greatly increases the efficiency of acquiring data by a user.

The foregoing is merely illustrative of the preferred embodiments of the present invention and it should be understood that the embodiments described above are only the most preferable embodiments of the present invention and are not intended to be limiting of the present invention, and various changes and modifications may be made by those skilled in the art. Any modifications, equivalent substitutions, improvements, and the like within the spirit and principles of the present invention are intended to be included within the scope of the present invention.

What is claimed is:

1. A computer-implemented service packaging method based on web page segmentation and search algorithm, comprising following steps executed by a processor:

conducting a service extraction stage comprising dynamic packaging and static packaging, wherein, for dynamic packaging, parsing a dynamic web page, tagging forms that exist in parsed dynamic form information, and tagging and defining, by a user, desired forms among the forms that exist; for static packaging, parsing a static web page, blocking and tagging parsed static forms, and selecting and defining, by the user, desired blocks, and filling in a name, description information and an extraction rule of a service;

conducting a service calling stage, wherein the user inputs related information for calling a service, and generating, by a back end system, a respective service according to the received related information for calling the service and according to an extraction rule, and returning the service to a front end; and wherein the dynamic packaging comprises following steps:

S1-1: parsing a dynamic web page, specifically comprising:

S1-1-1: filling in, by a user, a Uniform Resource Locator (URL) address, the URL address being any web link accessible by Internet;

S1-1-2: using crawler technology to crawl a source code of a web page corresponding to the URL address;

S1-1-3: judging whether there is a <form> tag in a search page, converting the source code of the web page into a structured class data, and searching the <form> tag in the class data, and tagging the <form> tag;

S1-1-4: constantly printing out parsed log information in a Graphical User Interface (GUI) display background;

S1-1-5: using image processing technique to tag all form information that exist in the dynamic web page, and location of each input box and a submit button in each form;

S1-2: selecting, by the user, a form and defining input parameter information, specifically comprising:

S1-2-1: independently selecting, by the user, whether the user needs to use the form, if the user does, selecting the form number, and if the user doesn't, skipping this step;

S1-2-2: independently defining, by the user, a name and a sample value of each input box, and selecting a number of the submit button; and S1-2-3: submitting the information modified by the user to a background, and generating, by the background, a form extraction rule based on the information; and wherein, the static packaging comprises:

S1-3: parsing a static web page, specifically comprising:

S1-3-1: using crawler technology to crawl a source code of a web page corresponding to a Uniform Resource Locator (URL) address;

S1-3-2: using a breadth-first search algorithm to search all items that exist in the static web page;

S1-3-3: using page segmentation algorithm to merge all items with the same structure into a block;

S1-3-4: using a weighted sorting algorithm to screen out at most 10 largest blocks;

S1-3-5: using image processing technology to tag the screened blocks;

S1-3-6: constantly printing out parsed log information in a Graphical User Interface (GUI) display background;

S1-4: selecting, by the user, the screened blocks and defining input parameter information;
   S1-4-1: independently selecting, by the user, a number of the screened blocks desired by the user;
   S1-4-2: defining, by the user, a name and description of data number in the screened blocks automatically analyzed by a system, and judging whether the screened blocks are desired;
   S1-4-3: filling in, by the user, a name and description information of a to-be-generated service;
   S1-4-4: submitting, by the system, the service information modified by the user and the extraction rule of each item to a service generation background in a JSON format;
S1-5: generating a service;
   S1-5-1: parsing, by the service generation background, the service information and the extraction rule information, and checking fault tolerance;
   S1-5-2: generating, by the service generation background, the service desired by the user, and an address, and a query parameter corresponding to calling the service, for waiting for calling;
wherein, a crawler tool of the crawler technology is Selenium+BeautifulSoup+Pyquery in Python™3.6.

2. The computer-implemented service packaging method according to claim 1, wherein, the breadth-first search algorithm is as follows:
generating a Document Object Model (DOM) tree structure of the web page, creating a traversal sequence list, putting HyperText Markup Language(HTML) nodes in the traversal sequence list, traversing the traversal sequence list sequentially, putting child nodes of each node at end of the list until all the nodes are traversed.

3. The computer-implemented service packaging method according to claim 1, wherein, the weighted sorting algorithm is as follows: sorting a first 15 blocks to create a first list according to numbers of list items in each block from large to small; sorting another first 15 blocks to create a second list according to a block size of each block from large to small; and selecting intersection of the first and second lists and selecting first 10 blocks as a largest block finally selected.

4. The computer-implemented service packaging method according to claim 1, wherein, a specific process of the service calling stage is:
S2-1: filling in, by the user, a query parameter specified by the service, and calling Application Programming Interface (API);
S2-2: opening, by a calling background, a real Uniform Resource Locator (URL) address corresponding to the API by using crawler technology according to an address of the API called by the user;
S2-3: deciding, by the calling background, whether to fill in and query the form information according to the user's selection upon packaging the service;
S2-4: using, by the calling background, crawler technology to crawl a source code of the web page after the form is processed;
S2-5: extracting, by the system, related items in the page according to the stored extraction rule information, and performing structural conversion and generating a returned result according to a name and parameters of the returned result defined by the user;
S2-6: performing screening, by the calling background, on the returned result according to the query parameter of the user;
S2-7: returning, by the system, a calling result to the front end.

5. A computer-implemented service packaging method based on web page segmentation and search algorithm, comprising following steps executed by a processor:
conducting a service extraction stage comprising dynamic packaging and static packaging, wherein, for dynamic packaging, parsing a dynamic web page, tagging forms that exist in parsed dynamic form information, and tagging and defining, by a user, desired forms among the forms that exist; for static packaging, parsing a static web page, blocking and tagging parsed static forms, and selecting and defining, by the user, desired blocks, and filling in a name, description information and an extraction rule of a service;
conducting a service calling stage, wherein the user inputs related information for calling a service, and generating, by a back end system, a respective service according to the received related information for calling the service and according to an extraction rule, and returning the service to a front end; and
wherein the dynamic packaging comprises following steps:
S1-1: parsing a dynamic web page, specifically comprising:
   S1-1-1: filling in, by a user, a Uniform Resource Locator (URL) address, the URL address being any web link accessible by Internet;
   S1-1-2: using crawler technology to crawl a source code of a web page corresponding to the URL address;
   S1-1-3: judging whether there is a <form> tag in a search page, converting the source code of the web page into a structured class data, and searching the <form> tag in the class data, and tagging the <form> tag;
   S1-1-4: constantly printing out parsed log information in a Graphical User Interface (GUI) display background;
   S1-1-5: using image processing technique to tag all form information that exist in the dynamic web page, and location of each input box and a submit button in each form;
S1-2: selecting, by the user, a form and defining input parameter information, specifically comprising:
   S1-2-1: independently selecting, by the user, whether the user needs to use the form, if the user does, selecting the form number, and if the user doesn't, skipping this step;
   S1-2-2: independently defining, by the user, a name and a sample value of each input box, and selecting a number of the submit button; and
   S1-2-3: submitting the information modified by the user to a background, and generating, by the background, a form extraction rule based on the information; and
wherein, the static packaging comprises:
S1-3: parsing a static web page, specifically comprising:
   S1-3-1: using crawler technology to crawl a source code of a web page corresponding to a Uniform Resource Locator (URL) address;
   S1-3-2: using a breadth-first search algorithm to search all items that exist in the static web page;
   S1-3-3: using page segmentation algorithm to merge all items with the same structure into a block;
   S1-3-4: using a weighted sorting algorithm to screen out at most 10 largest blocks;

S1-3-5: using image processing technology to tag the screened blocks;

S1-3-6: constantly printing out parsed log information in a Graphical User Interface (GUI) display background;

S1-4: selecting, by the user, the screened blocks and defining input parameter information;

S1-4-1: independently selecting, by the user, a number of the screened blocks desired by the user;

S1-4-2: defining, by the user, a name and description of data number in the screened blocks automatically analyzed by a system, and judging whether the screened blocks are desired;

S1-4-3: filling in, by the user, a name and description information of a to-be-generated service;

S1-4-4: submitting, by the system, the service information modified by the user and the extraction rule of each item to a service generation background in a JSON format;

S1-5: generating a service;

S1-5-1: parsing, by the service generation background, the service information and the extraction rule information, and checking fault tolerance;

S1-5-2: generating, by the service generation background, the service desired by the user, and an address, and a query parameter corresponding to calling the service, for waiting for calling;

wherein, a crawler tool of the crawler technology is Selenium+BeautifulSoup+Pyquery in Python™3.6;

wherein, the breadth-first search algorithm is as follows: generating a Document Object Model (DOM) tree structure of the web page, creating a traversal sequence list, putting HyperText Markup Language(HTML) nodes in the traversal sequence list, traversing the traversal sequence list sequentially, putting child nodes of each node at end of the list until all the nodes are traversed;

wherein, the weighted sorting algorithm is as follows: sorting a first 15 blocks to create a first list according to numbers of list items in each block from large to small; sorting another first 15 blocks to create a second list according to a block size of each block from large to small; and selecting intersection of the first and second lists and selecting first 10 blocks as a largest block finally selected; and wherein, a specific process of the service calling stage is:

S2-1: filling in, by the user, a query parameter specified by the service, and calling Application Programming Interface (API);

S2-2: opening, by a calling background, a real Uniform Resource Locator (URL) address corresponding to the API by using crawler technology according to an address of the API called by the user;

S2-3: deciding, by the calling background, whether to fill in and query the form information according to the user's selection upon packaging the service;

S2-4: using, by the calling background, crawler technology to crawl a source code of the web page after the form is processed;

S2-5: extracting, by the system, related items in the page according to the stored extraction rule information, and performing structural conversion and generating a returned result according to a name and parameters of the returned result defined by the user;

S2-6: performing screening, by the calling background, on the returned result according to the query parameter of the user;

S2-7: returning, by the system, a calling result to the front end.

* * * * *